July 31, 1945.   H. MICHAELS   2,380,862
ROTATABLE STRUCTURE
Filed June 5, 1943
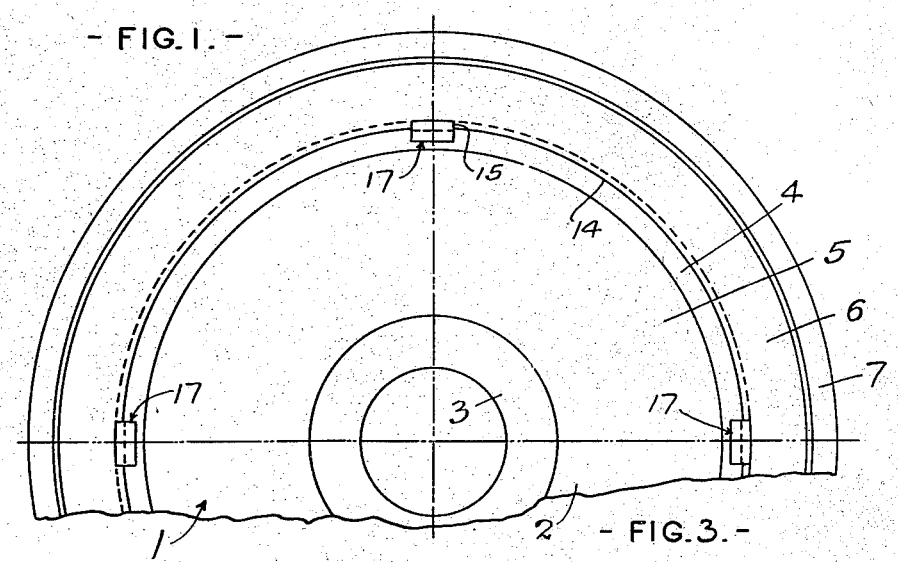
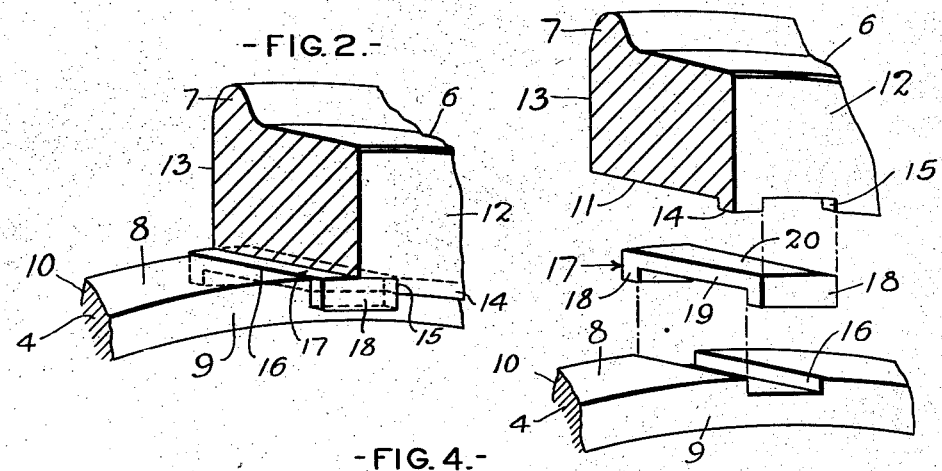
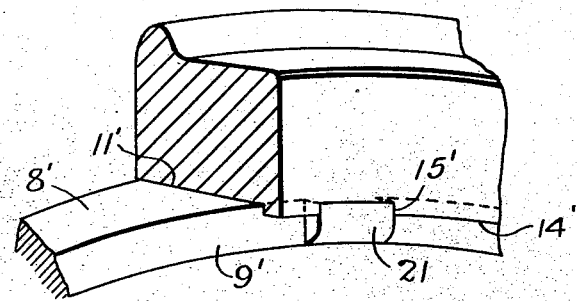
INVENTOR
Hunter Michaels
BY S.C. Yeaton
ATTORNEY Patented July 31, 1945

2,380,862

UNITED STATES PATENT OFFICE 2,380,862

ROTATABLE STRUCTURE

Hunter Michaels, New York, N. Y., assignor to American Locomotive Company, New York, N. Y., a corporation of New York Application June 5, 1943, Serial No. 489,756

1 Claim. (Cl. 295—19)

This invention relates to a rotatable structure, and more particularly to retaining means for holding a rim-like member and an annular member mounted thereon, forming part of said structure, against relative rotative movement.

The object of the present invention is to provide a retainer for positively preventing rotative movement between a rim-like member and an annular member mounted thereon.

While the invention is intended to include rotatable structures generally having the above characteristics, it is, for illustrative purposes, shown in connection with a railway vehicle wheel where it has decided merit.

Referring to the drawing forming a part of this application, Figure 1 is a front elevation of a wheel embodying the present invention, parts being broken away; Fig. 2 is an isometric view, partly in section, of a portion of the wheel showing a tire retainer; Fig. 3 is a view similar to Fig. 2, with the parts opened up in raised positions; and Fig. 4 is a view, similar to Fig. 2, of a modification of the invention.

The railway vehicle wheel, indicated generally by the reference numeral 1, may be of any desired design, the type chosen for illustration purposes including a center 2 having a hub 3, a rim 4 and a web 5 connecting the hub and rim, and a tire 6 having the usual wheel flange 7 for engaging a track.

The rim has an outer cylindrical face 8, a front side face 9 and a rear side face 10. The tire has an inner cylindrical face 11, a front side face 12 and a rear side face 13. The face 11 engages the face 8.

The retainer of the present invention contemplates tongue and groove means to lock the tire and wheel center rim together to positively prevent rotative movement therebetween, such for instance as rotative movement caused by brake application heating and expanding the tire and loosening it on the rim. As many of these retainers may be employed as desired, four being employed in the present instance, at equal distances apart. However, in the case of a railway vehicle wheel, it is believed that a single retainer means will be sufficient. In carrying out the invention the tire is so made as to have a portion extending forwardly of the face 9, from which portion extends radially inwardly a lip 14 overlapping face 9.

As the tongue and groove connections shown in Fig. 1 are similar, only one will be described. Accordingly a rectangular slot 15 is formed in the lip 14. It will be noted that by disposing the slot 15 in the lip 14 only and not in the face 11, the face 11 presents an uninterrupted surface for support of the tire on the rim. This is important for were the slot 15 made in the face 11, incipient manufacturing fractures in the walls of the slot might cause the formation of cracks which, due to the load supported by the tire, would eventually spread and cause the tire to crack. A rectangular slot 16, in registry with the slot 15, is formed in the face 8 and extends across the rim from the face 9 to the face 10. A channel-shaped key 17 providing front and rear lugs 18 and a connecting plate 19 having an outer face 20, fits upon the rim with the plate 19 in the slot 16 and with the front and rear lugs 18 extending beyond the rim and overlapping the rim front and rear faces 9 and 10 respectively, the front lug 18 fitting in the slot 15 and the face 20 being flush with the face 8.

In assembling the parts, the key is first placed in position on the rim and the tire is then shrunk on the rim, the tire being positioned in front of the wheel center with the slot 15 in registry with the slot 16, and then moved upon the rim until the slot 15 engages the front lug 18.

Fig. 4 shows a modification of the invention. The slot 16 and key 17 of the first embodiment are not here employed, but instead a lug 21, integral with the rim at the face 9' thereof, is employed, the lug 21 serving in place of the front lug 18 of the first embodiment and fitting in the slot 15' formed in the lip 14'. There will be, of course, as many of the interfitting lugs 21 and slots 15' as desired. In this embodiment the face 9' is uninterrupted, providing the best mounting for face 11'.

While there have been hereinbefore described approved embodiments of this invention, it will be understood that many and various changes and modifications in form, arrangement of parts and details of construction thereof, may be made without departing from the spirit of the invention, and that all such changes and modifications as fall within the scope of the appended claim are contemplated as a part of this invention.

The invention claimed and desired to be secured by Letters Patent is:

A railway vehicle wheel comprising a one-piece rim having an outer cylindrical face with a transverse groove; a bar housed in said groove flush with said face, having extended permanent end flanges engaging the sides of said rim; and a demountable tire having an inner continuous cylindrical face tightly engaging said rim face and a flange engaging a side of said rim provided with a groove therein engaging the bar flange adjacent thereto.

HUNTER MICHAELS.